UNITED STATES PATENT OFFICE.

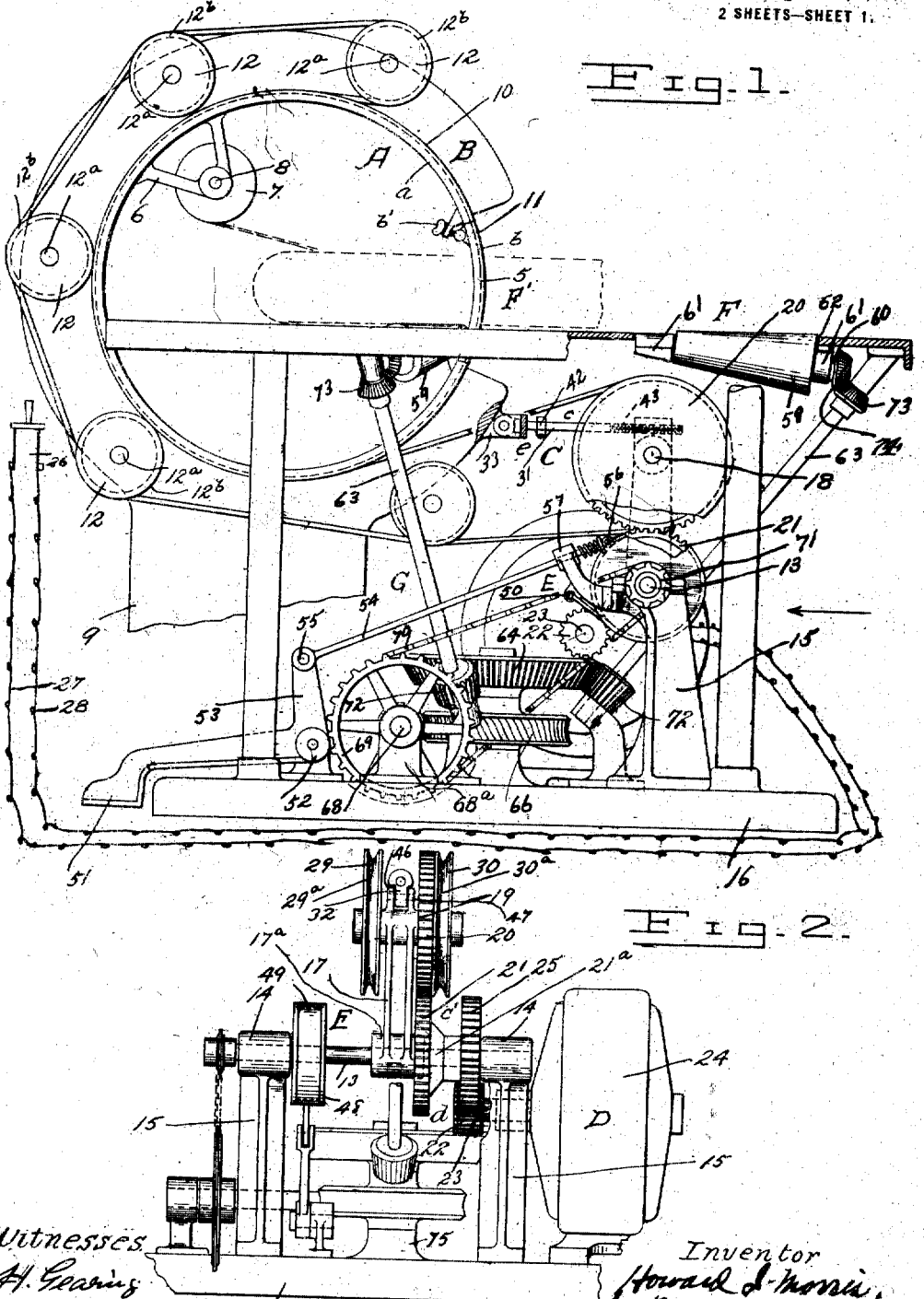

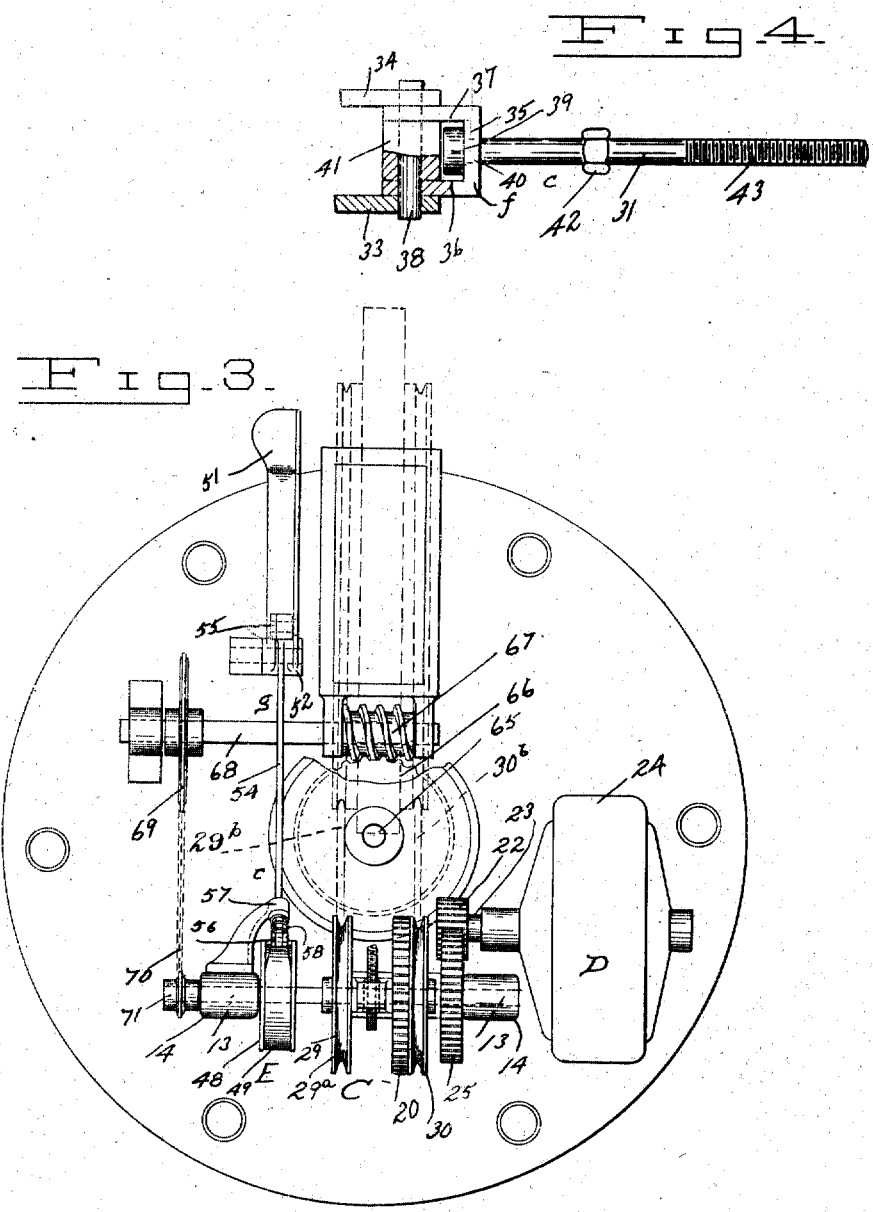

HOWARD I. MORRIS, OF SAN DIEGO, CALIFORNIA, ASSIGNOR, BY MESNE ASSIGNMENTS, TO THE DE LASKI AND THROPP CIRCULAR WOVEN TIRE COMPANY, OF TRENTON, NEW JERSEY, A CORPORATION OF NEW JERSEY.

TIRE-WRAPPING MACHINE.

1,279,405.

Specification of Letters Patent.

Patented Sept. 17, 1918.

Application filed December 1, 1916. Serial No. 134,479.

*To all whom it may concern:*

Be it known that I, HOWARD I. MORRIS, a citizen of the United States, residing at San Diego, in the county of San Diego and State of California, have invented new and useful Improvements in Tire-Wrapping Machines, of which the following is a specification.

This invention relates to tire wrapping machines and more particularly to improvements in the shuttle operating mechanism therefor, with the object in view of providing improvements in the means for driving and stopping the shuttle.

A further object of the invention is to provide means of the general character stated which will be relatively simple and inexpensive in construction and organization considered with the advantage gained over other forms of drive means, as in increased output and facility in adjustment, which will permit readily stopping and starting the annulus, and which will be generally superior in reliability and serviceability.

With the above and other objects in view, the invention consists in the novel and useful provision, formation, combination, association and inter-relation of parts, members and features, all as hereinafter disclosed, shown in the drawings, and finally pointed out in claims.

In the drawings the invention is shown as applied to a tire wrapping machine of the type disclosed in United States patent to Albert de Laski and Peter D. Thropp, No. 1,011,450, dated December 12, 1911, but the pressure mechanism shown in the machine of the said patent has been omitted, as its presence is not necessary for an understanding of the invention.

Figure 1 represents a side elevation, partly diagrammatic, of tire wrapping mechanism constructed and organized to embody the invention;

Fig. 2 represents an end view of a portion of the showing in Fig. 1, and looking in the direction of the large arrow near Fig. 1;

Fig. 3 represents a plan view of a portion of the drive mechanism shown in Figs. 1 and 2; and Fig. 4 represents an enlarged plan view (partly in section) of details of construction of the adjustment means.

Referring with particularity to the drawings, in the embodiment of the invention therein shown, A designates an annular rotatable shuttle, B supporting means therefor, C the drive means for the shuttle, c adjusting mechanism for the mechanism C, D designates motive means for the drive means, E braking means, F means for rotating a tire to be wrapped, and G driving mechanism for the means F.

The shuttle A preferably comprises a major portion $a$ and a minor portion $b$ such portions being, after a tire has been introduced into the major portion, united as by means of a bolt and wing nut device $b'$. The shuttle is provided at each of its edges with external V-grooves 5 adapted for co-action with the belts of the drive means C. An internally ranging bracket 6 is provided in the shuttle and such bracket is adapted to rotatably support a spool or roll 7 of wrapping material, an axle 8 for such spool being provided on the bracket 6. The spool lies close to the interior wall of the shuttle so as to permit insertion of large sized tires therein and such spool is carried in the rotation of the annulus about the tire to wrap the same in the well known manner.

The support B in which the shuttle is rotatably mounted preferably comprises an upright member 9 having a horizontal bore 10 in which the annulus is guided by its periphery, said member 9 being interrupted, as at 11, to permit the insertion of tires into the shuttle when the minor portion of the annulus is removed. The support is slightly narrower than the shuttle and pairs of pulleys or idlers 12 are spaced about the bore 10 in the member 9, each such pulley 12 being mounted for rotation upon a stub shaft or pivot $12^a$, it being understood that while Fig. 1 of the drawings only discloses a single series of such pulleys, pulleys are provided at the opposite side of the frame or upright 9 and are coaxial with the pulleys 12. The shuttle projects into the plane of these pulleys 12 at each side of the support and the grooves 5 in the shuttle are each in registration with belt receiving grooves $12^b$ in the pulleys 12.

The drive means C comprises a countershaft 13 journaled in suitable bearings 14 provided on upright frame members 15 springing from a suitable base 16, an oscillatory arm 17 rotatably mounted on said countershaft, a bodily movable shaft 18 journaled in a suitable bearing 19 provided at the free end of said arm 17, means of operative connection $c'$ between said shaft 18 and said countershaft whereby rotatory movement may be imparted to shaft 18 by said countershaft; and means of operative connection $d$ between said countershaft and the motive means D. The oscillatory arm is formed with a boss $17^a$ at its lower end which boss is apertured to accommodate the shaft 13 serving as a suitable support for the arm 17. The means $c'$ comprises a gear 20 fixedly mounted on the shaft 18 at one side of the arm 17, and an intermeshing gear 21 fixedly mounted at its hub $21^a$ on the shaft 13 and between the bearings 14 thereof, and in the plane of rotation of the gear 20. The means of operative connection $d$ comprises a pinion 22 fixedly mounted on the shaft 23 of an electric motor 24 on the base 16, and a gear 25 fixedly mounted on the shaft 13 beside the gear 21 and in mesh with such pinion. The motor 24 constitutes the motive means D and the supply of electrical energy to such motor may be controlled through a switch 26 in the circuit wires 27 and 28.

A plurality of drive pulleys 29 and 30 are secured to the shaft 18, one at each side of the arm 17 and the grooves $29^a$, and $30^a$ provided in the respective pulleys 29 and 30 are each in a plane of one of the sets of pulleys 12 and the plane of belt actuation, the belts being indicated at $29^b$ and $30^b$ respectively, such belts being comprised within the drive means C. The belt $29^b$ is rove about the pulley 29 and partially about the shuttle, and is returned over the pulleys 12; while the belt $30^b$ is rove about the pulley 30 and over the other set of the pulleys 12 at the opposite side of the shuttle, and partially about the shuttle.

The adjusting mechanism $c$ for the drive means C comprises a rotatable threaded rod 31, a pivoted member 32 provided on the arm 17 at the upper end thereof, and further means of pivotal connection $e$ whereby one end of said rod may abut against unyielding frame portions. The pivotal means $e$ comprises a pair of ears 33 and 34 provided in the plane of oscillation of the arm 17 on the upright frame member 9, a member $f$ having a portion 35 extending transversely of the plane of oscillation of the arm 17 and having wings 36 and 37 confined between the ears 33 and 34, and a pivot 38 passed through suitable apertures in the parts 33, 34, 36 and 37, whereby oscillation of the member $f$ in a vertical plane is permitted. The rod 31 is headed as at 39 and passes through an aperture 40 provided in the portion 35 of the member $f$, the head 39 abutting against a bushing 41 surrounding the pivot 38, thereby permitting rotation of the rod but preventing endwise movement thereof. A nut portion 42 is provided on the rod to receive a suitable tool whereby the rod may be rotated, and the outer end of the rod is threaded as at 43 for coaction with the pivoted member 32, which latter is introduced between upstanding ears 46 on the arm 17 and a pin 47 passed through such ears and through a suitable bore provided in the member 32.

The braking means E comprises a brake drum 48 fixedly mounted on the shaft 13 and adapted for rotation therewith, a brake band 49 partially encircling said brake drum and fixed to a frame member at one of its ends as at 50 and secured to brake operating means $g$ at its other end. The brake operating means $g$ may comprise a conveniently located pedal 51, pivotally mounted on the base 16 as at 52 and having an upstanding bell-crank arm 53, and a brake operating rod or link 54 pivotally secured at one end to the belt crank arm 53, as at 55, and pivotally secured to one end of the brake band, as at 56. The rod 54 passes through a boss 57 provided on the framework or the upright 15 thereof and extending into the path of the rod, a compression spring 58 being interposed between such boss and the end of the brake band at the point of pivotal connection 56.

The means F for rotating the tire shown in dotted lines at F', may comprise a plurality of radially disposed conical rollers 59 provided with shafts 60 disposed obliquely to the horizontal plane and mounted in journal boxes 61 provided beneath a table top 62 upon which the tire may be placed. The table top is cut away as at 62 to permit the intrusion of the rollers therethrough for contact with the tire F'. The means G is shown as comprising a plurality of obliquely disposed shafts 63, one of which is provided for actuating each of the rollers 59, a horizontally disposed miter gear 64 fixed to a shaft 65, a worm wheel 66 likewise fixed to the shaft 65, a worm 67 fixed to a shaft 68 suitably journaled on the base 16, as at $68^a$, a sprocket 69 on the worm shaft 68, a chain 70 rove about the sprocket 69 and about a smaller sprocket 71 fixedly mounted on the countershaft 13, and gearing provided on the shafts 63 and on the shafts 60 of the conical rollers 59, one of the shafts 63 being arranged to transmit power from the miter gear 64 to each of the conical rollers 59 by means of the gearing on the shaft 63 which comprise in each instance, a lower miter gear 72 and an upper miter gear 73, the lower miter gear 72 meshing with the miter gear 64 and the upper miter gear meshing with a smaller miter gear 74 one of which is provided on each of the shafts 60 of the rollers 59. The shaft 65 is journaled in the framework or base of the mechanism as at 75 and the worm 67 provided on the shaft 68 actuates the gear 64 through the worm wheel 66 fixed to the shaft 65.

The operation, method of use and advantages of the invention will be readily understood from the foregoing description taken in connection with the accompanying drawings and the following statement:

The gate of the shuttle being removed while the latter is in the position shown in Fig. 1, a cirular tire to be wrapped may be placed on the table top 62 and on the conical rollers 59 for rotation thereby. After the tire has been so positioned the shuttle may be again completed by replacing the gate and bolting or otherwise securing the same in place, and the tape from the spool 7 started about the tire. Upon throwing the electric switch 26 the motor will be energized and will drive the countershaft 13 through the means of operative connection $d$, and the shaft 18 with the pulleys 29 and 30 thereon through the means of operative connection $b'$. The shuttle will thus be set in motion by the power imparted by the belts 29$^b$ and 30$^b$, and will, in its rotation, carry the spool 7 around the portion of the tire in the wrapping zone or the plane of shuttle rotation, and as, due to the inter-connection of the rollers 59 with the countershaft 13 and through the same with the motive means D, the rollers will be set in motion upon the application of power to the countershaft, the tire will be rotated about its axis to present new surfaces or portions to be wrapped in the wrapping zone. The nature of the intermediate gearing provided between the countershaft and the rollers permits of a great speed reduction as between the countershaft 13 and the rollers 59 so that such rollers are moved at just the proper rate to feed successive tire portions through the wrapping zone in the shuttle as the operation proceeds. When the wrapping of a tire has been so completed, the switch may be thrown to cut off the supply of electrical energy to the motor 24; whereupon the operator may, by stepping on the pedal 51, apply the brake 54 to the brake drum 48 and thus cause the rotating parts to come to rest. The gate of the shuttle may then again be removed and the wrapped tire replaced by a fresh tire to be wrapped. To adjust the belt tension a wrench or the like may be applied to the nut portion 32 of the rod 31 and the same rotated to cause the screw threaded portion 43 of the rod 31 to enter farther into the member 32 or to emerge from such member 32 according to the direction of rotation and to whether the belt is to be tightened or slackened. As the belt stretches from use, the rod 31 of course will be rotated in such direction as to force the oscillatory arm 17 in a direction away from the annulus and thus apply the right degree of tension to readjust the belt.

It will be understood that various changes may be resorted to in the form, construction and arrangement of the several parts without departing from the spirit and scope of my invention, and hence I do not intend to be limited to the details herein shown and described except as they may be specifically set forth in the claims.

Having thus disclosed my invention, I claim and desire to secure by Letters Patent:

1. In a tire wrapping machine, a rotary shuttle, a support for the shuttle, a belt for driving the shuttle, a drive pulley for the said belt, a power shaft, said drive pulley being mounted to oscillate about the power shaft, and mechanism for maintaining the drive pulley in a predetermined adjustment, said mechanism being fixed to the shuttle support and to the drive pulley.

2. In a tire wrapping machine, a rotary shuttle, a support for the shuttle, a belt for driving the shuttle, a drive pulley for the said belt, means for rotating a tire, a power shaft common to the drive pulley and the tire rotating means, said drive pulley being mounted to oscillate about the power shaft, and mechanism for maintaining the drive pulley in a predetermined adjustment, said mechanism being fixed to the shuttle support and to the drive pulley.

3. In a tire wrapping machine, a rotary shuttle, a support for the shuttle, a belt for driving the shuttle, a drive pulley for the said belt, a power shaft, said drive pulley being mounted to oscillate about the power shaft, mechanism for maintaining the drive pulley in a predetermined adjustment, said mechanism being fixed to the shuttle support and to the drive pulley, and means for instantaneously stopping the rotation of the power shaft when the power is turned off.

4. In a tire wrapping machine, a rotary shuttle, a support for the shuttle, a belt for driving the shuttle, a drive pulley for the said belt, a power shaft, said drive pulley being mounted to oscillate about the power shaft, mechanism for maintaining the drive pulley in a predetermined adjustment, said mechanism being fixed to the shuttle support and to the drive pulley, and manually controlled means for instantaneously stopping the rotation of the power shaft when the power is turned off.

5. In a tire wrapping machine, a rotary shuttle, a support for the shuttle, a belt for driving the shuttle, a drive pulley for the said belt, a power shaft, said drive pulley being journaled in a rocker arm mounted on the power shaft, and means for adjusting said drive pulley about the power shaft and toward and away from the shuttle support, said means comprising a rod engaging the shuttle support and the rocker arm and means for varying the effective length of said rod.

6. In a tire wrapping machine, a rotary shuttle, a support for the shuttle, a belt for driving the shuttle, a drive pulley for the said belt, a power shaft, said drive pulley being journaled in a rocker arm mounted on the power shaft, and means for adjusting said drive pulley about the power shaft and toward and away from the shuttle support, said means comprising a rotatable rod pivoted to the shuttle support and the rocker arm and having a threaded engagement with the one, whereby the rotation of the rod will vary its effective length.

In testimony, whereof I have signed my name to this specification in the presence of two subscribing witnesses.

HOWARD I. MORRIS.

Witnesses:
ARTHUR J. SAVAGE,
CHAS. SPREEKE.